Jan. 10, 1928.
R. N. MURPHY
1,655,796
PLUMBING FITTING
Filed April 14, 1926
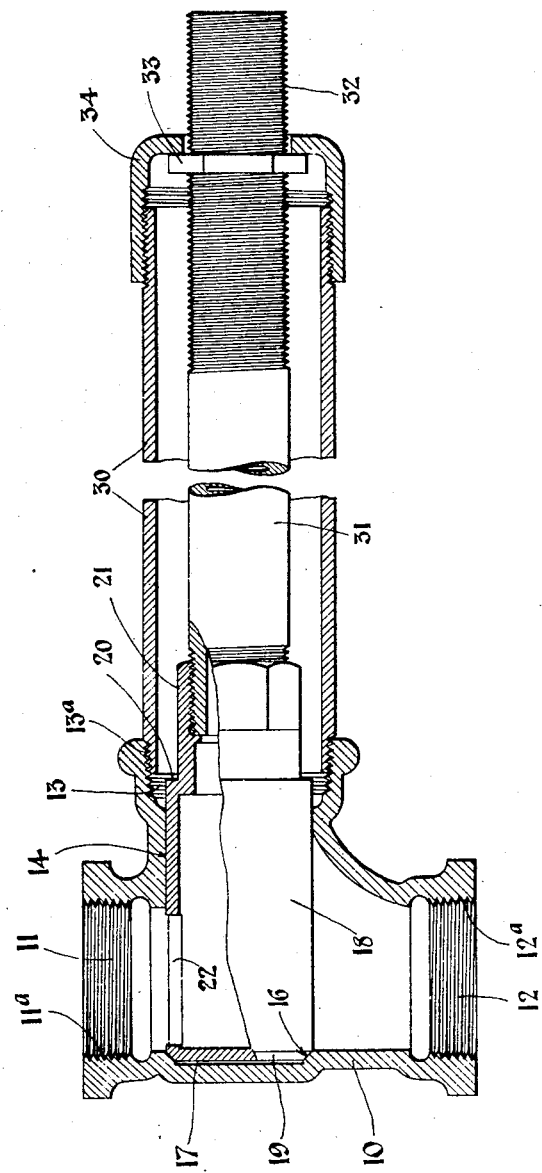
ROBERT NICHOLAS MURPHY.
INVENTOR.
Marks & Clerk
BY  ATTORNEYS.

Patented Jan. 10, 1928.

1,655,796

UNITED STATES PATENT OFFICE.

ROBERT NICHOLAS MURPHY, OF OTTAWA, ONTARIO, CANADA.

PLUMBING FITTING.

Application filed April 14, 1926, Serial No. 101,967, and in Canada March 23, 1926.

My invention relates to plumbing fittings and more particularly to a fitting intended to be employed at the junction of a fixture trap and the waste and vent pipes. The main object of the invention is to provide a fitting which will enable the flushing means of the waste-line to be reached and actuated although the same may be at a distance in rear of a wall. Other objects will become apparent in the following description which refers to the appended drawing.

In this device, the same flushing principle as in co-pending applications, Serial Nos. 17,875 and 24,876, but the device differs from that shown in the pending applications above referred to by the fact that it does not form a part of the trap. The fitting proper, as shown in the drawing, consists of a casting 10, of a shape commonly known as a T Y having two aligned openings 11 and 12 and one opening 13 perpendicular thereto. A direct bore is provided between the openings 11 and 12 of the same size as that of the pipe to which the fitting is adaptable. The openings are provided with standard pipe threads 11ª, 12ª and 13ª. The opening 13 leads to a straight bore 14 which is slightly larger than the bore between 11 and 12 and ends in a small depression at the back of the fitting. The opening 11 receives a pipe leading from the trap of a fixture while the opening 12 receives a pipe leading to the waste.

The bore 14 terminates at a small chamfer 16 and a further clearance depression 17. The flushing plug 18 is of a size to fit the bore 14 so that when it is inserted therein as shown in the drawing it will completely close the passage from 11 or 12. The end of the plug 18 is chamfered at 19 in order to fit with chamfer 16 and provide a tight seal. As shown, the depression 17 is not occupied by any part of the plug. This is intended to permit a tight fitting of the plug around the edge 19. The plug consists of a hollow tubular casting closed at one end as shown, and reduced in diameter at the other end providing a ledge 20, the reduced portion 21 being internally threaded.

A part of the extension 21 is either finished hexagonal or square so that the same may be easily turned by means of a key or wrench. An opening 22 of comparatively narrow width and having a length of approximately the diameter of the passage between 11 and 12 is provided as shown and will come in line with either opening 12 or 11 as desired.

The invention is particularly important as in some instances it would be impossible to have flushing means directly underneath or in rear of the fixture on account of the construction of the wall or various obstructions; such as, bricks and girders as used in fireproof constructions. It may be also that the waste-line is at a distance from the wall so that the fitting could not be reached from the inside of a room unless some special means were provided. The fitting is provided with a piece of piping 30 of length sufficient to reach the inside of the room.

The opening 13 should be threaded for a pipe of one size larger than those received by openings 11 and 12 so that the pipe will permit the plug to be inserted through the pipe 30. The plug is provided with an extension consisting of a pipe 31, screwed into the plug, the greater portion of the pipe 31 being threaded as at 32. Means are provided for holding the plug 18 firmly in place after it has been inserted into the fitting 10. Such means may consist of a nut 33 mounted on the pipe 31 and engaging the thread 32. After the plug on the pipe 31 has been inserted, the nut 33 can be adjusted on the pipe 31 so that when a perforated cap 34 is screwed on an extension pipe 30, it will hold the plug tightly in place.

When the flushing has been effected, the plug is removed as well as the cap 34 and pipe 30 is closed by an ordinary cap.

What I claim is:

A plumbing fitting comprising a body portion providing aligned openings at the top and bottom, an integral branch connection having a cylindrical bore at right angles to the axis of said openings, and having at its outer end an internal screw thread of larger diameter than said bore, a pipe having a screw thread engaging the screw thread on the branch connection and a cap member screwed on the outer end of said pipe, in combination with a hollow flushing plug adapted to fit in said bore and having an aperture registerable with one or other of said openings by rotation of the plug, a pipe of smaller diameter than the plug secured to said plug and forming an extension thereof, and means for holding the flushing plug in operative position.

Ottawa, March 10th, 1926.

R. N. MURPHY.